Sept. 26, 1933.  C. C. FARMER  1,927,932
FLUID PRESSURE BRAKE
Filed Feb. 3, 1932
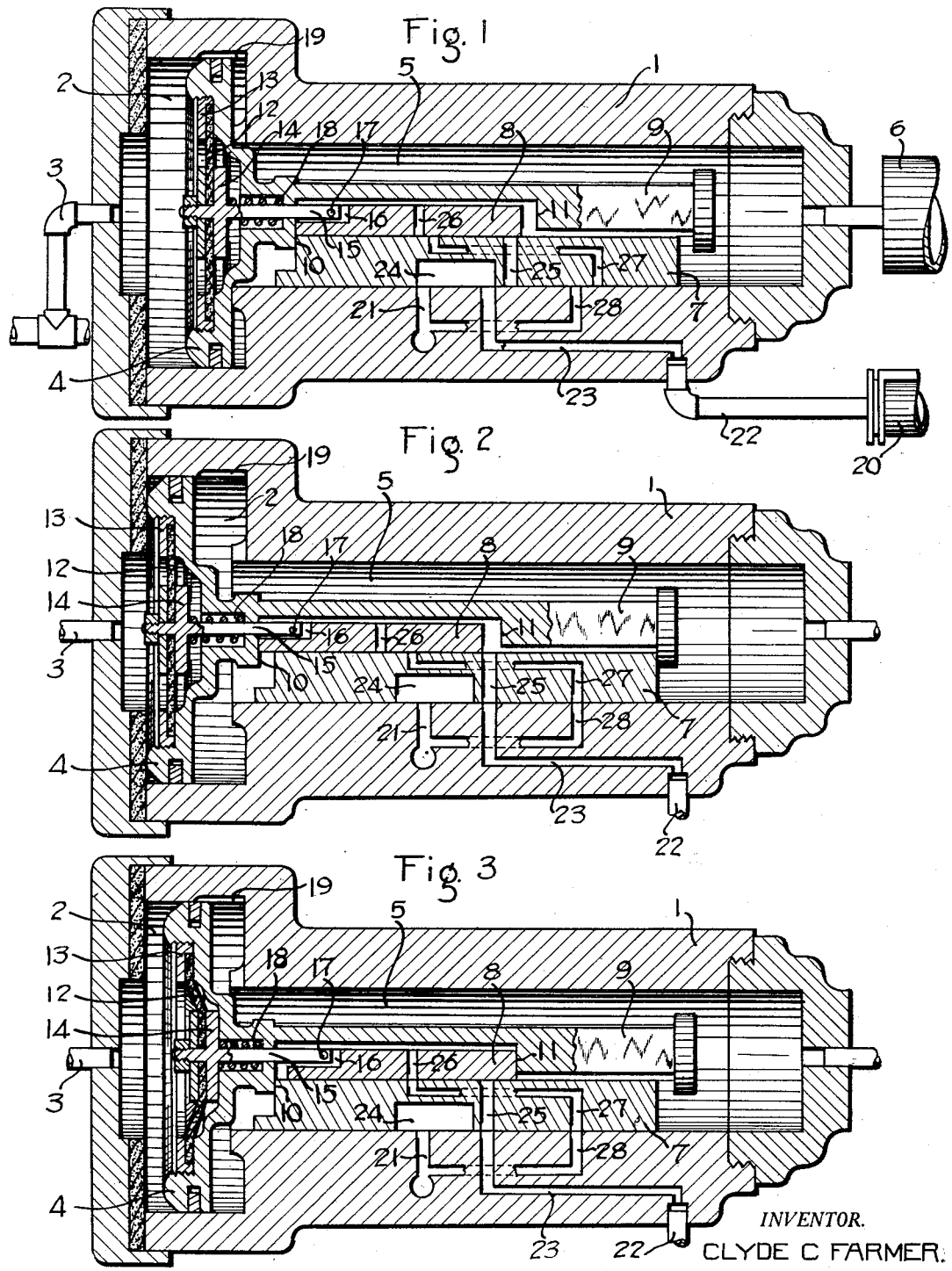
INVENTOR.
CLYDE C. FARMER.
BY Wm. H. Cady
ATTORNEY.

Patented Sept. 26, 1933

1,927,932

UNITED STATES PATENT OFFICE 1,927,932

FLUID PRESSURE BRAKE

Clyde C. Farmer, Pittsburgh, Pa., assignor to The Westinghouse Air Brake Company, Wilmerding, Pa., a corporation of Pennsylvania Application February 3, 1932. Serial No. 590,564

4 Claims. (Cl. 303—70)

This invention relates to fluid pressure brakes, and more particularly to a triple valve device for a fluid pressure brake system, which is operated upon a reduction in brake pipe pressure to supply fluid under pressure to the brake cylinder, and upon an increase in brake pipe pressure to release fluid from the brake cylinder.

After the triple valve device has been operated upon a reduction in brake pipe pressure to supply fluid under pressure to the brake cylinder, and the brake pipe pressure is increased to effect the release movement of the triple valve moving parts, the main slide valve of the triple valve device may sometimes have such high resistance to movement that the valve will stick and thus prevent the release movement of the parts, unless the increase in brake pipe pressure is very rapid.

The principal object of my invention is to provide a triple valve device with means operative upon an increase in brake pipe pressure in releasing the brakes to facilitate and ensure the release movement, by venting fluid under pressure from the auxiliary reservoir.

In the accompanying drawing; Fig. 1 is a sectional view of a triple valve device embodying my invention, and showing the moving parts of the triple valve device in release position; Fig. 2 a similar view, showing the moving parts of the triple valve device in service application position; and Fig. 3 a similar view, showng the moving parts of the triple valve device in the positions initially assumed after the brake pipe pressure has been increased to effect the release of the brakes.

The triple valve device may comprise a casing 1 having a piston chamber 2, connected to the brake pipe 3 and containing piston 4, and having a valve chamber 5 at the opposite side of the piston 4, connected to the auxiliary reservoir 6 and containing a main slide valve 7, and an auxiliary or graduating slide valve 8 having a movement relative to the main slide valve. Said valves are operated in the usual manner, by the piston 4, through piston stem 9.

According to my invention, a lost motion space is provided between the ends of the graduating valve 8 and the operating shoulders 10 and 11 of the piston stem 9, so that the piston stem has a movement relative to the valve.

Mounted in an annular recess provided in the piston 4 is a movable abutment, preferably in the form of a flexible diaphragm 12, which may be secured in place by means of a threaded collar 13, having screw-threaded engagement in the piston. Secured centrally to the diaphragm 12 is a member 14, having a stem 15, which extends rearwardly through a bore in the piston stem 9, and into a recess 16, cut in the valve 8 at its forward end. The stem 15 is operatively connected to the valve 8, through a pin 17. A coil spring 18 surrounds the stem 15 and is mounted in a recess in the piston stem 9, so as to oppose inward movement of the diaphragm 12 relative to the piston 4.

In operation, with the moving parts of the triple valve device in release position, as shown in Fig. 1, when the brake pipe 3 is charged with fluid under pressure in the usual manner, fluid under pressure flows from the brake pipe to the piston chamber 2 of the triple valve device, and thence through the usual feed groove 19 around the piston to the valve chamber 5 and the auxiliary reservoir 6, thus charging the auxiliary reservoir with fluid under pressure. In release position, as shown in Fig. 1, the brake cylinder 20 is connected to the atmospheric exhaust port 21, through pipe 22, passage 23 and cavity 24 in the main slide valve 7.

When it is desired to effect a service application of the brakes, a reduction in brake pipe pressure is effected, causing outward movement of the piston 4 to close the feed groove 19 and moving the graduating valve 8 relatively to the main slide valve 7, so that the service port 25 in the main slide valve is uncovered. The further movement of the piston 4 then operates the main slide valve 7 and moves same to service application position, as shown in Fig. 2, in which the service port 25 registers with brake cylinder passage 23. Fluid under pressure is then supplied, in the usual manner, from valve chamber 5 and the auxiliary reservoir 6 to the brake cylinder 20.

When the auxiliary reservoir pressure has been reduced by flow to the brake cylinder, to a degree slightly less than the reduced brake pipe pressure, the piston 4 moves the graduating valve 8 to lap position, so as to close off the service port 25, the lap position of the piston being the same as that shown in Fig. 3.

When the brake pipe pressure is increased to effect the release of the brakes, after the brakes have been applied in the manner above described, if the increase in brake pipe pressure is not sufficient to cause the piston 4 to at once start the release movement of the main slide valve 7, then the operation of my release ensuring means will act to ensure such movement in the following manner.

When the brake pipe pressure is increased, a differential fluid pressure is created on the flexible diaphragm 12, which is subject to the opposing pressures of the auxiliary reservoir and the brake pipe. When the brake pipe pressure has been increased above the auxiliary reservoir pressure a predetermined degree, sufficient to overcome the pressure of the spring 18, the diaphragm 12 will be flexed inwardly to the position shown in Fig. 3, so that the graduating valve 8 is moved relatively to the piston 4 and the piston stem 9 to the position shown in Fig. 3. In this position, a port 26, through the graduating valve 8, registers with a port 27, through the main slide valve 7. In the service application position of the main slide valve, as shown in Fig. 3, the port 27 registers with a passage 28 which leads to the atmospheric exhaust port 21.

Consequently, when the graduating valve 8 is moved inwardly by flexing of the diaphragm 12, fluid under pressure will be vented from the auxiliary reservoir to the atmosphere, and the venting continues until the auxiliary reservoir pressure has been reduced to a point, such that the differential pressure between the brake pipe and the auxiliary reservoir will be sufficient to cause the piston 4 to shift the main slide valve 7 to release position. As soon as the main slide valve moves toward release position, the port 27 is moved out of registry with passage 28, so that further venting of fluid from the auxiliary reservoir is cut off.

When the triple valve parts have been shifted to release position, upon substantial equalization of fluid pressures between the auxiliary reservoir and the brake pipe, the spring 18 acts to return the diaphragm 12 and the graduating valve 8 to their normal positions, as shown in Fig. 1.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, an auxiliary reservoir, a brake cylinder, and a brake contolling valve device comprising a main valve, a graduating valve and a piston for operating said valves upon a reduction in brake pipe pressure to supply fluid under pressure from the auxiliary reservoir to the brake cylinder to effect an application of the brakes and upon an increase in brake pipe pressure to release fluid from the brake cylinder, of a movable abutment movable relatively to said piston upon an increase in brake pipe pressure for operating said graduating valve to vent fluid from the auxiliary reservoir.

2. In a fluid pressure brake, the combination with a brake pipe, an auxiliary reservoir, a brake cylinder, and a brake controlling valve device comprising a main valve, a graduating valve and a piston for operating said valves upon a reduction in brake pipe pressure to supply fluid under pressure from the auxiliary reservoir to the brake cylinder to effect an application of the brakes and upon an increase in brake pipe pressure to release fluid from the brake cylinder, of a flexible diaphragm associated with said piston and operatively connected to said graduating valve, said diaphragm being operated by an increase in brake pipe pressure to operate said graduating valve so as to vent fluid from the auxiliary reservoir.

3. In a fluid pressure brake, the combination with a brake pipe, an auxiliary reservoir, a brake cylinder, and a brake controlling valve device comprising a main valve, a graduating valve and a piston for operating said valves upon a reduction in brake pipe pressure to supply fluid under pressure from the auxiliary reservoir to the brake cylinder to effect an application of the brakes and upon an increase in brake pipe pressure to release fluid from the brake cylinder, of a flexible diaphragm associated with said piston and operatively connected to said graduating valve, said diaphragm being operated, with the main valve in brake application position, by an increase in brake pipe pressure to operate said graduating valve and thereby vent fluid from the auxiliary reservoir.

4. In a fluid pressure brake, the combination with a brake pipe, an auxiliary reservoir, a brake cylinder, and a triple valve device comprising a main valve, a graduating valve having a movement relative to the main valve and a movement relative to said piston, and a piston for operating said valves upon a reduction in brake pipe pressure to supply fluid under pressure from the auxiliary reservoir to the brake cylinder to effect an application of the brakes and upon an increase in brake pipe pressure to release fluid from the brake cylinder, of a flexible diaphragm carried by said piston and operatively connected to said graduating valve and operated by an increase in brake pipe pressure for moving said graduating valve relatively to said piston to a position for venting fluid from the auxiliary reservoir.

CLYDE C. FARMER.